United States Patent [19]

Loriot et al.

[11] Patent Number: 4,493,813

[45] Date of Patent: Jan. 15, 1985

[54] NEUTRON PROTECTION DEVICE

[75] Inventors: Pierre Loriot, Venelles; Michel Rendu; Jean Rousseau, both of Aix en Provence, all of France

[73] Assignee: Commissariat a l'Energie Atomique, France

[21] Appl. No.: 418,165

[22] Filed: Sep. 14, 1982

[30] Foreign Application Priority Data

Sep. 30, 1981 [FR] France ............................. 81 18413

[51] Int. Cl.³ ............................................. G21C 3/04
[52] U.S. Cl. .................................... 376/409; 376/202; 376/287; 376/419; 376/443; 376/446
[58] Field of Search .............. 376/419, 287, 456, 443, 376/172, 446, 202, 333, 334, 435, 428, 363, 409

[56] References Cited

U.S. PATENT DOCUMENTS

| 2,894,893 | 7/1959 | Carney, Jr. | 376/202 |
|---|---|---|---|
| 3,033,773 | 5/1962 | Schluderberg et al. | 376/363 |
| 3,275,522 | 9/1966 | Kinsey et al. | 376/456 |
| 3,356,585 | 12/1967 | Zebroski | 376/456 |
| 3,396,077 | 8/1968 | Bodnarescu | 376/202 |
| 3,481,833 | 12/1969 | Germond et al. | 376/334 |
| 3,573,169 | 3/1971 | Gumuchian | 376/435 |
| 4,123,326 | 10/1978 | Shinbo | 376/419 |

FOREIGN PATENT DOCUMENTS

| 713681 | 7/1965 | Canada | 376/202 |
|---|---|---|---|
| 2356243 | 1/1978 | France | 376/202 |
| 2065955 | 7/1981 | United Kingdom | 376/202 |

OTHER PUBLICATIONS

Energie Nucleaire, vol. 14, No. 3, 1972, pp. 161, 163, 164.

Primary Examiner—Harvey E. Behrend

[57] ABSTRACT

The present invention relates to an upper neutron protection device for a nuclear reactor assembly.

This device comprises at least one container partly filled with a neutron-absorbing product and maintained within a wall located in the upper part of the assembly by at least one spacing plate.

Application to fast neutron reactors.

11 Claims, 9 Drawing Figures

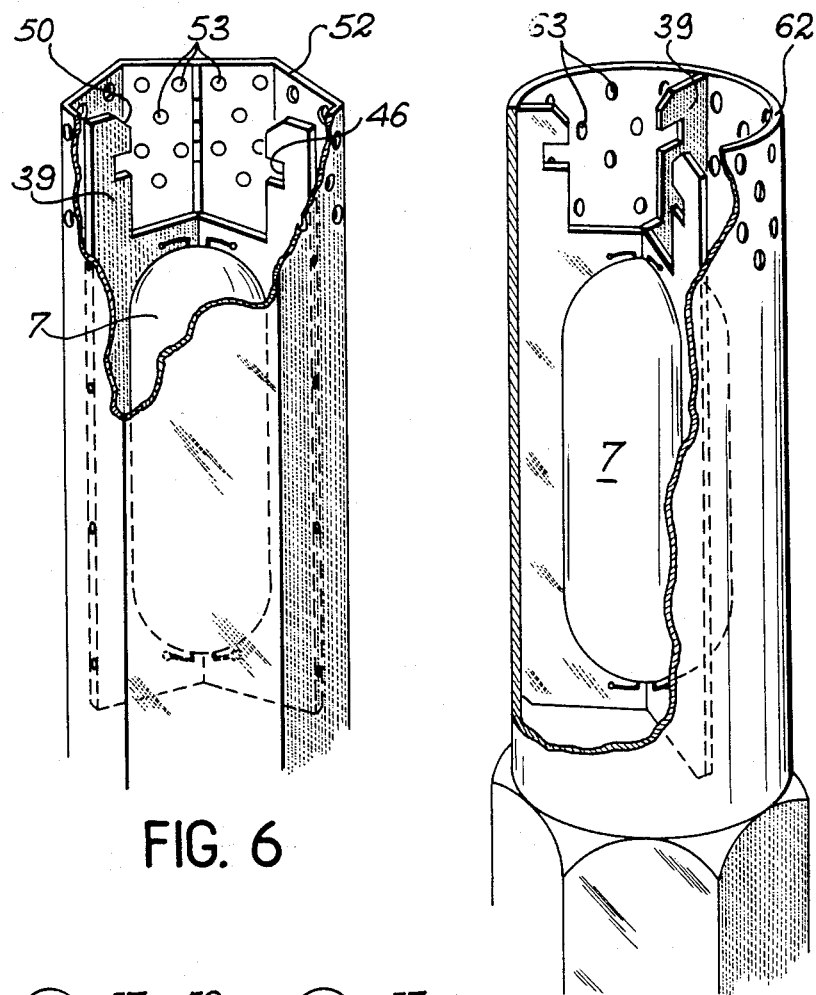
FIG. 6
FIG. 8
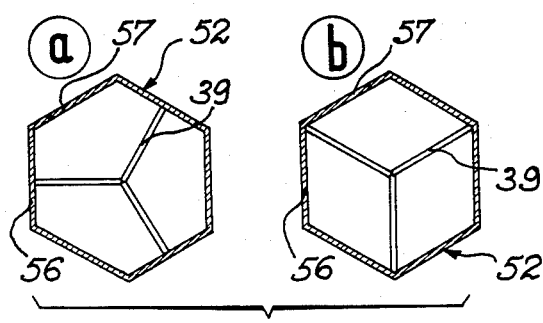
FIG. 7

NEUTRON PROTECTION DEVICE

BACKGROUND OF THE INVENTION

The present invention relates to an upper neutron protection device for a nuclear reactor assembly and more particularly for fast neutron reactors.

In such reactors, it is necessary to limit the activation of the secondary sodium passing through the heat exchangers and to reduce damage to the various primary components, particularly the reactor vessels. The standard method consists of confining the neutrons in the central area of the core, by placing on the periphery thereof assemblies only containing fertile material in order to absorb the neutrons and also by placing fertile material in the upper and lower parts of the fuel assemblies, on either side of the fissile material. The protection is completed by so-called "upper neutron protection" sleeves, positioned in the upper part of the assemblies.

In most existing systems, each assembly comprises in the upper part a head in the form of a sleeve and in the lower part a foot, which are disposed on either side of the assembly. The sleeve has a greater thickness than the assembly and the space provided in its central part makes it possible to circulate the cooling fluid, e.g. liquid sodium, from bottom to top through the assembly. However, it is known that the assemblies have to be replaced in the core and this takes place for each loading campaign of the latter, as a function of the irradiation undergone. Each spent assembly must be removed from the core and is then passed to a reprocessing installation, where the head, assembly and foot are separated from the needles or rods. As a result the sleeve is lost on each occasion, because it is fixed to the body of the assembly. Devices have also been proposed which have a removable sleeve, but the latter have a considerable wall thickness and often the fixing devices are complex, which increases the cost of the equipment and complicates disassembly.

BRIEF SUMMARY OF THE INVENTION

The present invention relates to a device obviating the aforementioned disadvantages, whilst being simple to construct and easy to disassemble, during the dismantling of the irradiated assembly.

According to the main feature of the upper neutron protection device according to the invention, the latter comprises a container, at least partly filled with a neutron-absorbing product, held in place with the aid of at least one spacing plate, the assembly constituted by the container and the spacing plates being located within a wall positioned in the upper part of the assembly body.

According to another feature of the invention, each of the aforementioned spacing plates has an outer edge, whereof at least part is substantially rectilinear and an inner edge, whereof at least part matches the shape of the container.

Two types of spacing plates are used in the device according to the invention. In the first type, called male spacing plates, the upper part projects beyond the top of the assembly body, has an outer edge which slopes from top to bottom towards the outside of the wall surrounding the device and has a slot opening towards the outside of the wall and permitting the attachment of a handling means. In the other type, called female spacing plates, they are level with the top of the assembly body and have at least one portion of the upper part of their inner edge which slopes from top to bottom towards the inside of the space defined by the aforementioned wall and, still in the upper part of their inner edge, a slot opening towards the inside of said space and which also makes it possible to attach a handling means.

These two types of plates prevent the inadvertent blocking of an assembly by another assembly during handling.

Finally, according to a special embodiment of the invention, the device has a plurality of containers, at least partly filled with a neutron-absorbing product, each of the containers being held in place by a single spacing plate.

BRIEF DESCRIPTION OF THE DRAWINGS

The invention is described in greater detail hereinafter relative to non-limitative embodiments and the attached drawings, wherein show:

FIG. 6 a view similar to that of FIG. 4 showing the device according to the invention equipped with female spacing plates and located within a hexagonal wall.

FIGS. 7a and 7b plan views of FIG. 6 showing two different ways of fixing the spacing plates to a hexagonal wall.

FIG. 8 a view similar to FIG. 6, but with a circular wall.

DETAILED DESCRIPTION OF THE PREFERRED EMBODIMENTS

Figure 1:
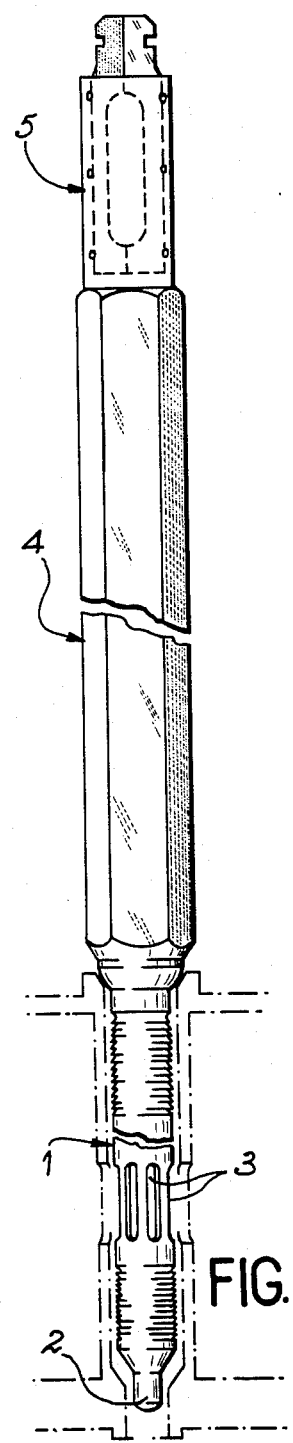
FIG. 1 a diagrammatic view showing a fast neutron reactor assembly with the device according to the invention in its upper part.

FIG. 1 shows an assembly for a fast neutron reactor, which is essentially in three parts. Foot 1, whose lower end 2 has a conical shape, so that it can be positioned in the bottom of the reactor vessel. There are also openings 3 via which the liquid sodium enters and then flows from bottom to top through the assembly. Body 4 thereof and containing the fissile or fertile needles, is surmounted by a neutron protection device 5 according to the invention.

Figure 2:
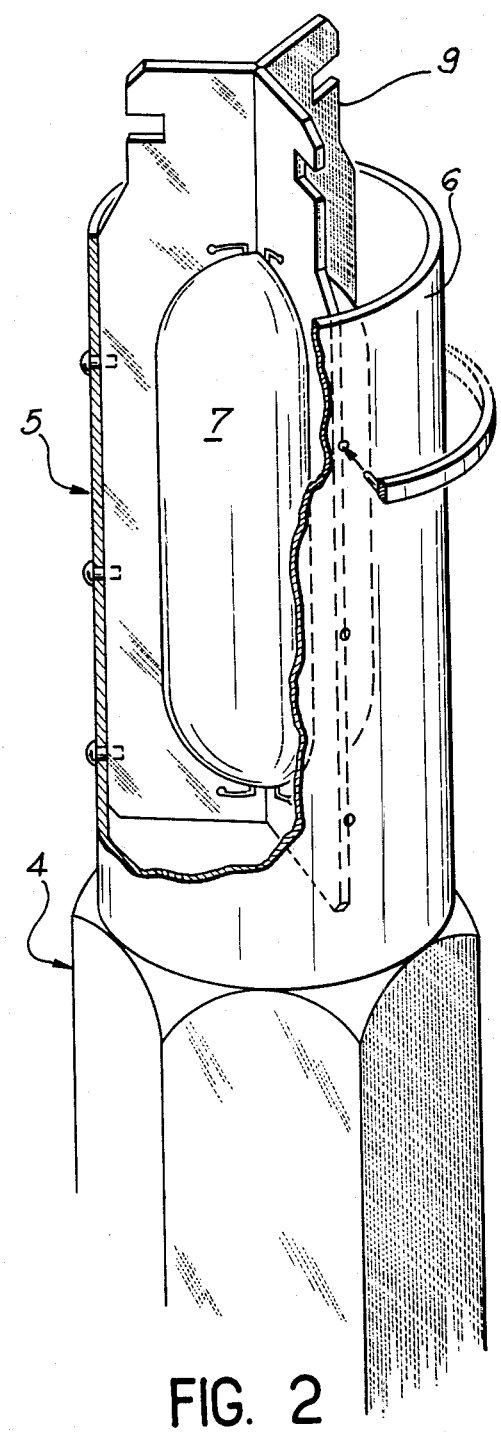
FIG. 2 a partly exploded perspective view showing the device according to the invention within the wall located in the upper part of the assembly.

This device 5 can best be seen in FIG. 2, where it is possible to see the upper part of assembly body 4 formed by a cylindrical wall 6. Within the latter there is a container 7 containing a product 8 able to absorb neutrons, e.g. boron carbide and kept within the wall 6 by three spacing plates 9 which, in the embodiment of FIG. 2, are male spacing plates.

Figure 3:
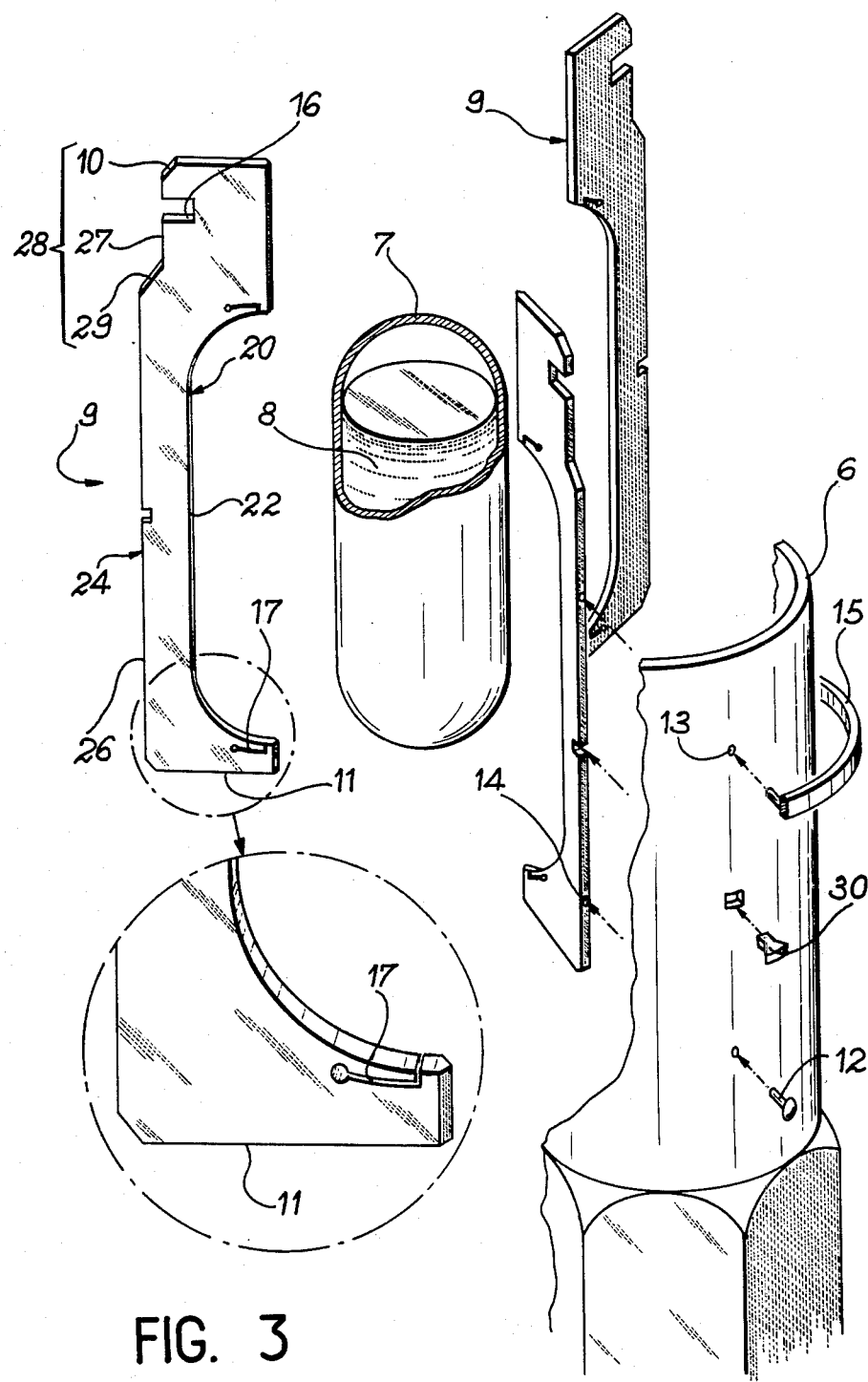
FIG. 3 a diagrammatic perspective view separately showing the different parts constituting the protection device according to the invention, in the case of male spacing plates.

The various parts, as well as the ways of fixing the spacing plates to the wall 6 will now be described in greater detail with reference to FIG. 3. In this embodiment, container 7 is held in place by three spacing plates 9. The latter can advantageously be made from stainless steel and can be obtained in a simple manner, e.g. by stamping rolled sheets, microfusion or hot forming.

It is possible to see in the drawing that each plate 9 has an inner edge 20, whereof part 22 is formed by a rectilinear portion terminated by two quarter circle portions in order to adapt to the shape of container 7, which is a cylinder terminated by two hemispheres.

With respect to the outer edge 24 of plate 9, it has a rectilinear portion 26 making it possible to fix plate 9 to wall 6. The upper part 28 of outer edge 24 is generally inclined from top to bottom towards the outside of the space defined by wall 6. In the special case here, it is possible to see from top to bottom an outwardly inclined off-corner or cant 10, a vertical portion 27 having a slot 16 opening towards the outside and an off-corner or cant 29, forming the junction with the rectilinear portion 26 of outer edge 24.

Once these various spacing plates have been disposed around container 7 and in contact therewith, they are joined to one another, e.g. by welding at the junction point of their upper part 28 and optionally at the junction point of their lower part 11.

The thus formed assembly is then introduced into wall 6 and spacing plates 9 are fixed to the latter. This operation can be carried out in several ways. For example, the fixing can take place by nailing using special nails 12 introduced into the holes 13 of wall 6 and holes 14 previously made on the face of each spacing plate in the rectilinear portion of the outer edge, it being possible to weld the head of each nail to wall 6. It is also possible to use profiled wedges 30, which are fitted into the spacing plates 9 and are maintained on wall 6 by welding. A third method consists of locally deforming wall 6 in such a way as to create bosses, which penetrate the slots previously made on the face of the spacing plates 9. Finally, it is possible to bring about this fixing by encircling using one or more flanges 15 passing round wall 6 and held thereon by welding. However, although these four methods are the most efficient and reliable, it is possible to use any other fixing method within the scope of the invention. In certain cases, spacers 9 can be provided with an anti-vibration system in the form of grooves 17 made in the upper part and/or lower part thereof. Such a groove is shown in the large-scale detail of FIG. 3.

Figure 4:
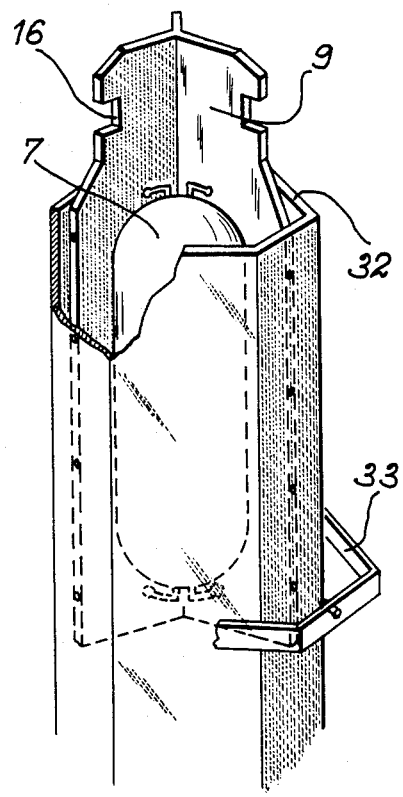
FIG. 4 a diagrammatic view of a device according to the invention equipped with male spacing plates and positioned within a hexagonal wall.

FIG. 4 shows the device within the hexagonal wall 32 and maintained in place by encircling with a hexagonal flange 33. In the case where male spacing plates are used, the upper part thereof projects beyond the upper edge of wall 6. This arrangement has a double advantage, namely it firstly permits coupling of the device by a handling means using slots 16. Moreover, it prevents the foot of another assembly from penetrating the neutron protection device. If such an incident occurs, there is a risk of blocking the passage of the liquid sodium to the upper part of the assembly. The invention eliminates this risk. The foot of the second assembly is deflected by plates 9 and the sodium can flow through at least one of the spaces defined by wall 32 and plates 9. Thus, even in the case of accidental stoppage of the circulating pumps, the heat can be evacuated by natural convection within the sodium mass.

Figure 5:
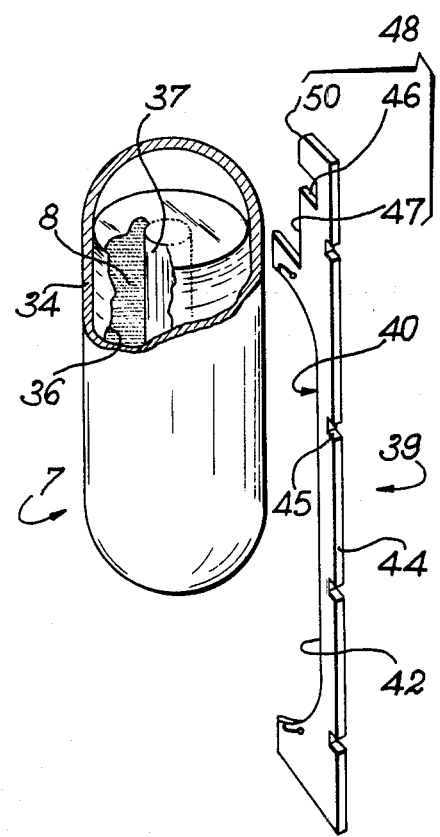
FIG. 5 a partly broken away view showing a special constructional form of the container containing the neutron absorbing product and a female spacing plate.

FIG. 5 illustrates the preferred embodiment of container 7 used in the invention and which contains the neutron-absorbing product. It can be seen that container 7 essentially comprises an outer stainless steel envelope 34 having the shape of a cylinder and whose possibly conical or hemispherical ends are sealed. Within this outer envelope is placed a stainless steel, but less thick inner envelope 36 and which is incompletely filled with boron carbide. Finally, in the centre of the inner envelope and essentially along the axis thereof, there is a tube 37 which can deform under the action of the swelling of the boron carbide and whose interior constitutes a free volume for containing the helium given off by the boron carbide during irradiation.

FIG. 5 also shows a female spacing plate 39 used in the device according to the invention. As in the case of the male spacing plate 9 described with reference to FIG. 3, there is a rectilinear outer edge 44 having notches 45 making it possible to fix plate 39 to a wall such as walls 6 or 32 and an inner edge 40, whereof part 42 adapts to the shape of container 7. The upper part 48 of inner edge 40 has a portion 50 which is inclined from top to bottom towards the interior of the device and is followed by a vertical part 47 in which there is a slot 46 for the coupling of the device by a handling means.

FIG. 6 shows a device equipped with female plates 39 placed within a hexagonal wall 52. This drawing shows that when female plates are used, the upper part thereof is level with the upper edge of wall 52.

This arrangement also makes it possible to couple the device by a handling means and, in the case of incorrect manipulation, the foot of another assembly only partly penetrates the interior of wall 52, so that the liquid sodium can flow into the spaces defined by container 7, plates 39 and wall 52. Holes 53 in the upper part of wall 52 are able to improve the evacuation of liquid sodium.

FIGS. 7a and 7b illustrate the two ways of arranging the spacers for fixing them to a haxagonal wall. For example plate 39 can be fixed in the centre of face 56 of wall 52 (FIG. 7a) or at the junction between faces 56 and 57 of the said wall (FIG. 7b).

FIG. 8 shows a device similar to that of FIG. 6 placed in a cylindrical wall 62. As female plates 39 are once again used, the upper part thereof does not project beyond the upper edge of wall 62 which, like wall 52 of FIG. 6, can have a certain number of holes 63 for the passage of liquid sodium.

Figure 9:
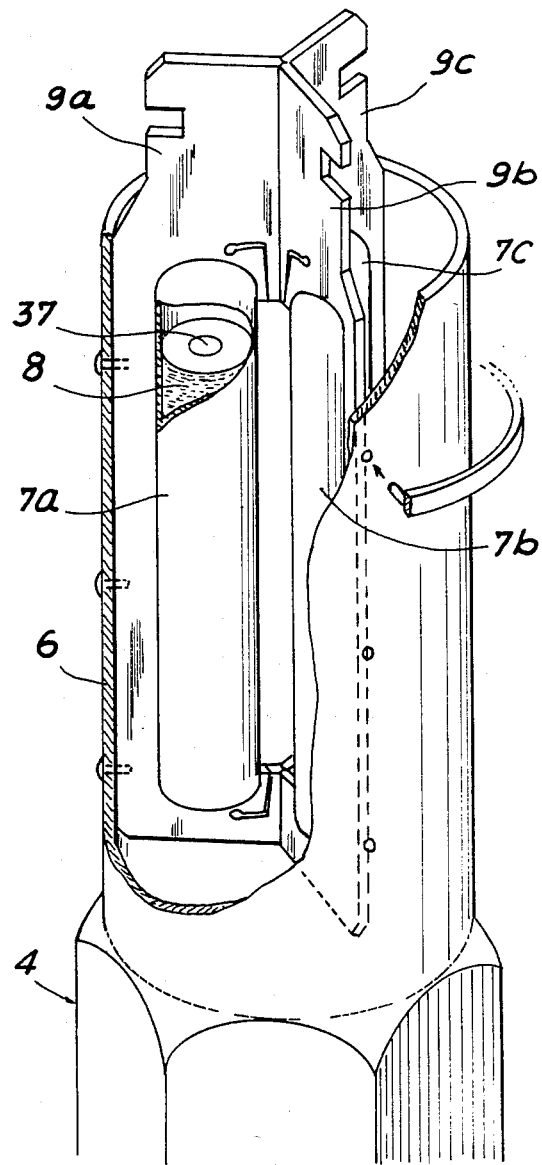
FIG. 9 a diagrammatic perspective view, partly broken away, illustrating a special embodiment in which the device has a plurality of containers, each held in place by a single spacing plate.

Finally, FIG. 9 illustrates a variant in which the device has several containers containing a neutron-absorbing product. It is possible to see a cylindrical envelope 6 fixed to the upper part of assembly 4 and within which there are three spacing plates 9a, 9b and 9c. In this case there are three containers 7a, 7b, 7c, each held in place by a single spacing plate, like container 7a in plate 9a. These containers are formed in the same way as container 7 of FIG. 5 with deformable tubes 37 disposed in the centre of the neutron-absorbing product 8.

The upper neutron protection device according to the invention has a certain number of interesting advantages, particularly easy manufacture, and becomes increasingly economical as the weight and size are reduced compared with the prior art devices using thick steel sleeves. Mounting and dismounting are very easy, which simplifies handling operations, particularly during the dismantling of irradiated assemblies. The storage volumes, either during the production of the assemblies, or during their dismantling are greatly reduced and, as a function of the particular case, it is possible to recover either the complete device, or the container 7, or the boron carbide only for reuse after decontamination. Finally, it is obvious that the invention is not limited to the embodiment described, which has been given in a completely non-limitative manner and numerous variants are possible thereto without passing beyond the scope of the invention. Thus, as a function of the particular case, the Expert can choose the number and shape of the spacing plates, as well as their production process, as well as the way in which they are fixed to wall 6.

Container 7 can contain boron carbide or any other product having good neutron absorbing properties.

We claim:

1. In a nuclear reactor fuel assembly comprising a foot and an assembly body connected to the foot having an upper part and a lower part, an upper neutron protection device comprising:
   a wall of substantially hollow shape and having an inner face and an outer face, said wall being fixed to said assembly body at the upper part thereof,
   at least one container comprising:
     a closed outer cylindrical envelope,
     an inner cylindrical envelope placed within said outer cylindrical envelope and whose thickness is smaller than the thickness of the outer envelope,
     a deformable tube located inside said inner cylindrical envelope and defining a space between said deformable tube and said inner cylindrical envelope, said space being incompletely filled with a product having a high neutron absorption cross-section, said at least one container being disposed within said wall and maintained by at least one spacing plate which is fixed to the inner face of the wall.

2. A device according to claim 1 wherein said at least one spacing plate has an outer edge, whereof at least part is substantially rectilinear and fixed to the inner face of the wall and an inner edge, whereof at least part matches the shape of the container.

3. A device according to claim 2, wherein the outer edge of said at least one spacing plate has an upper part and a lower part and has in its upper part a portion which is inclined from top to bottom towards the outside of the wall and a slot opening towards the outside of said wall and permitting the coupling of said device by a handling means.

4. A device according to claim 2, wherein the inner edge of said at least one spacing plate has an upper part and a lower part and has, in its upper part, a portion inclined from top to bottom towards the inside of the wall and a slot opening towards the inside of said wall and permitting the coupling of said device by a handling means.

5. A device according to claim 1 comprising a plurality of spacing plates which are joined to one another.

6. A device according to claim 1 wherein said at least one spacing plate has an anti-vibration system.

7. A device according to claim 6, wherein said anti-vibration system comprises at least one groove made in said at least one spacing plate.

8. A device according to claim 1 wherein said at least one spacing plate is fixed to said wall by means of nails having a head welded to said wall.

9. A device according to claim 1 wherein said at least one spacing plate is fixed to said wall by means of profiled wedges.

10. A device according to claim 1 wherein said at least one spacing plate is fixed to said wall by means of localized deformations of said wall penetrating slots made in said at least one spacing plate.

11. A device according to claim 1 wherein said at least one spacing plate is fixed to the wall by means of a flange fixed to said wall by welding.

* * * * *